United States Patent
Albrecht

(10) Patent No.: US 9,676,050 B2
(45) Date of Patent: Jun. 13, 2017

(54) WELDING SYSTEM WITH LOCKOUT MECHANISM

(75) Inventor: Bruce Patrick Albrecht, Neenah, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 1129 days.

(21) Appl. No.: 12/906,814

(22) Filed: Oct. 18, 2010

(65) Prior Publication Data

US 2011/0114616 A1 May 19, 2011

Related U.S. Application Data

(60) Provisional application No. 61/261,951, filed on Nov. 17, 2009.

(51) Int. Cl.
| B23K 9/095 | (2006.01) |
| B23K 9/10 | (2006.01) |
| B23K 9/133 | (2006.01) |
| B23K 9/32 | (2006.01) |

(52) U.S. Cl.
CPC ........... *B23K 9/095* (2013.01); *B23K 9/10* (2013.01); *B23K 9/133* (2013.01); *B23K 9/32* (2013.01)

(58) Field of Classification Search
CPC .......... B23K 9/095; B23K 9/10; B23K 9/133; B23K 9/32
USPC ............. 219/745, 147, 137.7, 137.71, 137.2, 219/137 PS, 130.1, 130.2, 130.31, 130.34, 219/130.5, 130.51, 132
See application file for complete search history.

(56) References Cited

U.S. PATENT DOCUMENTS

| 4,384,186 | A | * | 5/1983 | Burt | 219/769 |
| 4,645,902 | A | | 2/1987 | Hayakawa | |
| 5,278,390 | A | * | 1/1994 | Blankenship | 219/130.5 |
| 5,500,512 | A | | 3/1996 | Goldblatt | |
| 5,692,700 | A | | 12/1997 | Bobeczko | |
| 6,091,048 | A | | 7/2000 | Lanouette et al. | |
| 6,096,994 | A | | 8/2000 | Handa et al. | |
| 6,248,975 | B1 | | 6/2001 | Lanouette et al. | |
| 6,267,291 | B1 | | 7/2001 | Blankenship et al. | |
| 6,310,320 | B1 | * | 10/2001 | Kraus et al. | 219/133 |
| 6,348,671 | B1 | * | 2/2002 | Fosbinder et al. | 219/133 |
| 6,479,793 | B1 | * | 11/2002 | Wittmann | B23K 9/0953 219/130.5 |

(Continued)

OTHER PUBLICATIONS

International Search Report for application No. PCT/US2010/056753 mailed Feb. 21, 2011.

*Primary Examiner* — David Angwin
*Assistant Examiner* — Frederick Calvetti
(74) *Attorney, Agent, or Firm* — Fletcher Yoder P.C.

(57) ABSTRACT

Embodiments of a welding system including a controller adapted to implement a lockout mechanism are provided. The controller may be adapted to selectively activate a learn mode and a use mode of a component of the welding system. When the learn mode is activated, the controller receives an allowable data set and stores the allowable data set to memory. When the use mode is activated, the controller receives an operational data set, references the allowable data set to check if the operational data set is allowable, logs the operational data set and enables the component of the welding system to operate when the operational data set is allowable, and disables the component of the welding system when the operational data set is not allowable.

21 Claims, 3 Drawing Sheets

(56) References Cited

U.S. PATENT DOCUMENTS

| | | | |
|---|---|---|---|
| 6,510,984 B2 | 1/2003 | Blankenship et al. | |
| 6,536,660 B2 | 3/2003 | Blankenship et al. | |
| 6,552,303 B1* | 4/2003 | Blankenship et al. | 219/130.5 |
| 6,563,085 B2 | 5/2003 | Lanouette et al. | |
| 6,708,877 B2 | 3/2004 | Blankenship et al. | |
| 6,710,299 B2 | 3/2004 | Blankenship et al. | |
| 6,710,799 B2* | 3/2004 | Abnet et al. | 348/135 |
| 6,852,949 B2 | 2/2005 | Lanouette et al. | |
| 6,855,914 B1* | 2/2005 | Kaufman et al. | 219/137.71 |
| 6,858,817 B2* | 2/2005 | Blankenship et al. | 219/130.5 |
| 7,032,814 B2 | 4/2006 | Blankenship | |
| 7,323,658 B2* | 1/2008 | Rice et al. | 219/130.1 |
| 7,705,269 B2* | 4/2010 | Daniel | 219/130.21 |
| 2001/0015381 A1 | 8/2001 | Blankenship et al. | |
| 2003/0111451 A1* | 6/2003 | Blankenship et al. | 219/130.5 |
| 2004/0140301 A1* | 7/2004 | Blankenship et al. | 219/130.5 |
| 2005/0103767 A1* | 5/2005 | Kainec et al. | 219/130.5 |
| 2006/0163227 A1* | 7/2006 | Hillen et al. | 219/130.01 |
| 2006/0207980 A1* | 9/2006 | Jacovetty | B23K 9/1062 219/130.5 |
| 2007/0080149 A1 | 4/2007 | Albrecht et al. | |
| 2007/0080152 A1 | 4/2007 | Albrecht et al. | |
| 2007/0080153 A1 | 4/2007 | Albrecht et al. | |
| 2008/0061049 A1* | 3/2008 | Albrecht | 219/137 R |
| 2009/0222804 A1 | 9/2009 | Kaufman et al. | |
| 2010/0108654 A1* | 5/2010 | Ulrich | B23K 9/0953 219/130.5 |

* cited by examiner

WELDING SYSTEM WITH LOCKOUT MECHANISM

CROSS REFERENCE TO RELATED APPLICATIONS

This application is a Non-Provisional Patent Application of U.S. Provisional Patent Application No. 61/261,951 entitled "Suitcase Feeder with Wrong Wire Lockout", filed Nov. 17, 2009, which is herein incorporated by reference.

BACKGROUND

The invention relates generally to the field of wire feeders and/or welding systems. More specifically, the invention relates to a welding wire feeder with a lockout mechanism.

In certain applications, a welding wire feeder may be used to feed a welding wire through a torch to a weld location in front of the tip of the torch. In many applications, it may be desirable to move the wire feeder to a remote location or simply to a different location in a work area. Otherwise, the wire feeder may be required to drive the wire over an unnecessarily long run of conduit to the particular work location. As a result, the wire feeder may require a more robust and expensive drive mechanism. Since many conventional wire feeders are designed as stationary devices intended to remain within a particular work area, some "suitcase" wire feeders have been developed, are currently available, and are specifically designed to enable a user to carry the wire feeders to the desired location.

Such wire feeders are often operable with a variety of types of consumables, and any welding operator may generally operate any given wire feeder as desired. It is possible that a welding operator may not properly identify which consumables and processes are appropriate for use with which welding systems, thereby creating welding problems. Accordingly, there exists a need for wire feeders capable of overcoming such drawbacks with traditional systems.

BRIEF DESCRIPTION

In an exemplary embodiment, a wire feeder includes a housing, a spool mounting hub disposed in the housing and adapted to receive a wire spool, and control circuitry disposed in the housing and adapted to selectively enable a learning mode and a use mode. During the enabled learning mode, the control circuitry learns an allowable parameter set. During the enabled use mode, the control circuitry receives a desired parameter set, compares the desired parameter set to the allowable parameter set, enables the wire feeder to feed wire from the wire spool when the desired parameter set is contained within the allowable parameter set, and locks the wire feeder to prevent wire feed from the wire spool when the desired parameter set is not contained within the allowable parameter set.

In another embodiment, a method of controlling a wire feeder includes receiving a desired set of parameters, comparing the desired set of parameters to the allowable set of parameters, locking out the wire feeder to prevent wire feed from a wire spool when the desired set of parameters is not within the allowable set of parameters, and allowing wire feed from the wire spool of the wire feeder when the desired set of parameters is within the allowable set of parameters.

In another embodiment, a controller for a wire feeder is adapted to selectively activate a learn mode and a use mode of the wire feeder and receive an allowable data set and store the allowable data set to memory when the learn mode is activated. When the use mode is activated, the controller is also adapted to receive an operational data set, reference the allowable data set to check if the operational data set is allowable, log the operational data set and enable the wire feeder to operate when the operational data set is allowable, and disable the wire feeder when the operational data set is not allowable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of welding systems (e.g., wire feeders) including learning and lockout capabilities are provided. It should be noted that embodiments of the present invention are applicable to any of a variety of suitable components of a welding system. However, in the present disclosure, features of the exemplary welding systems are illustrated in the context of wire feeders, but such features are not meant to be limited to wire feeders. For example, the exemplary learning and lockout mechanisms, although described herein in the context of a wire feeder system, may be applicable to a variety of other welding system components, such as welding power supplies, welding accessories, and so forth.

Embodiments of the presently disclosed wire feeders may be capable of learning an allowable parameter set and/or job information such as allowable wire types, gas types, operators, and so forth, when operating in a learning mode. For example, the wire feeder may be adapted to enter learning mode, to receive instructions from an appropriate operator (e.g., a supervisor) or other information source (e.g., a main job information system) in a variety of suitable ways described in detail below, and to store the allowable parameter set to memory for future referencing. Further, during learning mode, the wire feeder may be capable of learning in a variety of ways and from a variety of suitable sources. For example, the wire feeder may learn from a supervisor and/or from a main job information center, and the learned information may be transferred via a variety of suitable wired or wireless connections. Additionally, the wire feeder may be adapted to enter a use mode during which an operator may insert the desired wire spool, couple the wire feeder to the desired gas cylinder, place one or more tags devices in proximity to the wire feeder, and so forth. Such actions may define a desired operational data set that is compared to the allowable data set. By making such a comparison, embodiments of the disclosed wire feeder may identify whether or not the desired operational data set is allowable. In such a way, embodiments of the wire feeders disclosed herein may be capable of learning allowable parameters and preventing operation of the wire feeder when a welding operator attempts to operate the wire feeder outside the range of allowable parameters.

Figure 1:
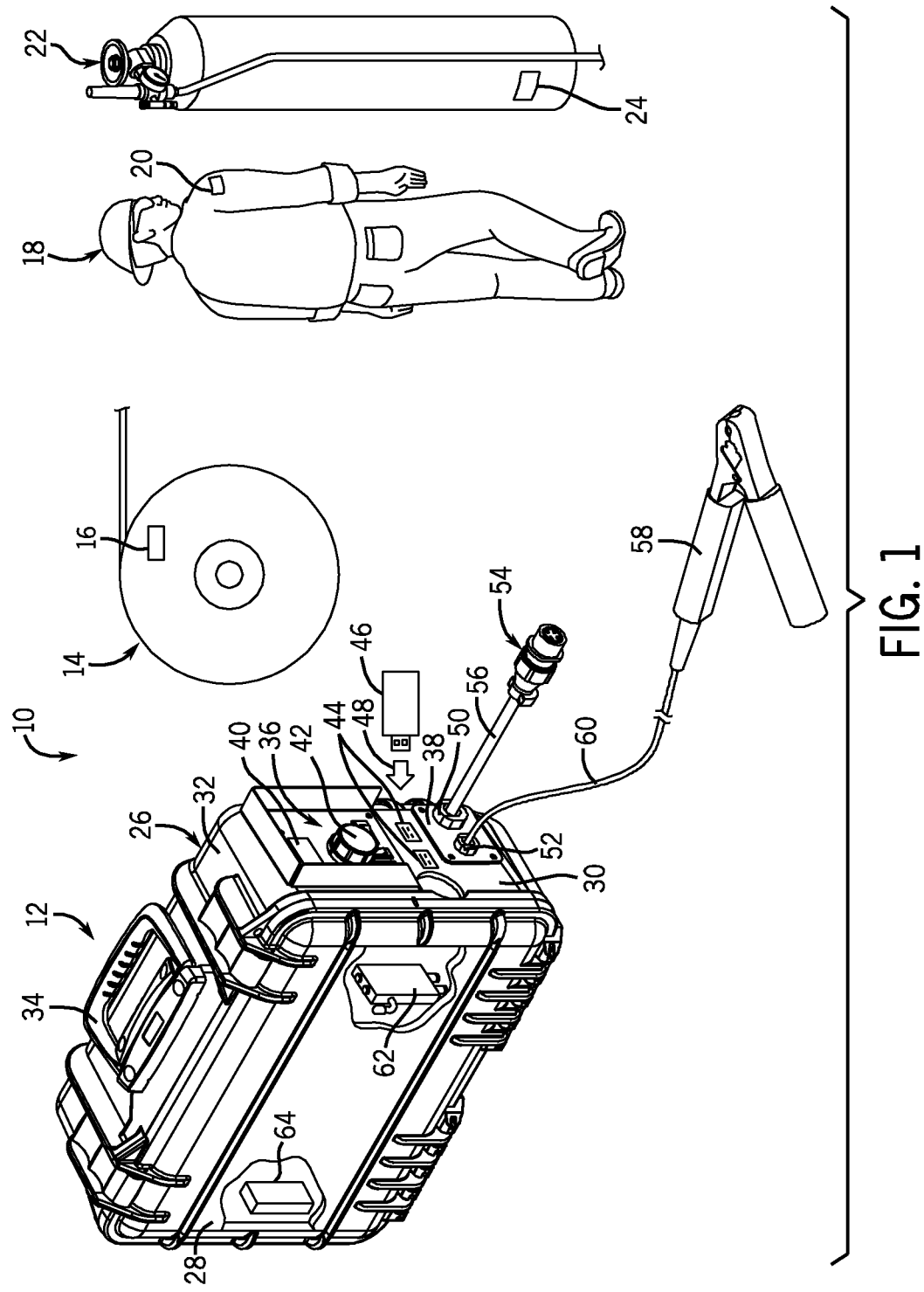
FIG. 1 illustrates an exemplary wire feeding system enabled with a lockout mechanism in accordance with aspects of the present invention.

Turning now to the drawings, FIG. 1 illustrates an exemplary wire feeding system 10 including a wire feeder 12 configured to provide welding wire for a welding operation. In some embodiments, the wire feeder 12 may be a compact wire feeder (e.g., a suitcase wire feeder) configured for use in welding applications that require a portable wire feeder. For example, such compact wire feeders may be utilized in applications where the weight and size of the wire feeder are constrained by environmental factors, such as in shipbuilding applications. For further example, such compact wire feeders may be capable of being moved from one location to another by a human user without the use of tools, machines, vehicles, and so forth.

As shown, the illustrated system 10 includes the wire feeder 12, a wire spool 14 with an associated wireless tag 16, a welding operator 18 with an associated wireless tag, and a gas cylinder 22 with an associated wireless tag 24. The compact wire feeder 12 includes a housing 26 with a side panel 28, a front panel 30, and a top panel 32. The top panel 32 includes a handle 34, which allows a welding operator to move the portable wire feeder 12 from one location to another without the use of a tool, machine, or vehicle. Such a feature may allow the operator to position the portable wire feeder as desired in welding environments that may not be accessible to larger vehicles or transportation tools.

Still further, the front panel 30 of the compact wire feeder 12 includes a control panel 36 and an electrical panel 38. The illustrated control panel 36 includes a meter 40, such as a voltmeter and/or a wire speed/amperage meter, and a wire feed speed adjustment knob 42, which may be rotated by an operator to adjust the speed of the wire exiting the wire feeder during use. In some embodiments, the meter 40 may be configured to display one or more parameters to a user during a welding operation. For example, a voltmeter may be configured to display the arc voltage during a weld and to display the open circuit voltage during idling. For further example, a wire speed/amperage meter may be configured to display wire feed speed and/or amperage during the welding process. The control panel 40 may include additional switches, meters, knobs, and so forth, or fewer of such components, as desired for the given application. For example, in some embodiments, the wire feeder control panel 36 may also include a jog/purge switch configured to allow an operator to jog wire without energizing the contactor or gas valve, a trigger hold switch configured to allow the operator to weld without holding a welding gun trigger, a power switch configured to allow the operator to turn the unit ON or OFF, and so forth.

The illustrated electrical panel 38 includes universal serial bus (USB) ports 44 configured to receive a USB device 46, as indicated by arrow 48. The electrical panel 38 also includes a first electrical connection 50 and a second electrical connection 52. In the illustrated embodiment, the first electrical connection 24 couples to a gun trigger receptacle 54 via cable 56, and the second electrical connection 52 couples to a ground clamp 58 via cable 60. The gun trigger receptacle 54 is further adapted to mate with a gun trigger plug coupled to a welding torch. As such, the gun trigger receptacle 54 is configured to couple to a variety of welding guns suitable for use in a variety of welding processes, such as metal inert gas (MIG) welding or any other welding process that utilizes a wire feed.

In the illustrated embodiment, the wire feeder 12 includes a monitoring device 62 and a controller 64 disposed therein. However, in further embodiments, the monitoring device 62 may be located anywhere in or on the wire feeder 12, the power supply, a welding accessory, or any other component of the welding system. During operation, the monitoring device 62 and the controller 64 may enable the wire feeder 12 to learn an allowable set of parameters. In one embodiment, a learning mode of the wire feeder 12 may be enabled, for example, by flipping a switch to a "learn mode" position on the control panel 36 and entering a code that unlocks the wire feeder, thus allowing the wire feeder to learn. Subsequently, a certified operator (e.g., a supervisor) may teach the controller 64 an allowable set of parameters via a reader located in the monitoring device 62 and through one or more wireless tags located on one or more allowable devices. For example, in the illustrated embodiment, the allowable devices may include the wire spool 14, the operator 18, and the gas cylinder 22, although in other embodiments, other types of allowable devices may include such wireless tags. In such an embodiment, the wireless tags 16, 20, and 24 may be configured to communicate a unique identification tag or code to the monitoring device 62 via a suitable wireless communication protocol, such as RuBee low frequency magnetic signal communication, radio-frequency identification (RFID) communication, and so forth. In such a way, the user may communicate one or more sets of allowable devices to the controller 64 in the wire feeder 12.

In the illustrated embodiment, the tags 16, 20, and 24 are wireless communication devices. However, in further embodiments, such tags may be any suitable identification tag capable of communicating a unique identification code. For example, the tags may be barcodes adapted to be scanned for future communication with the wire feeder 12. In such embodiments, the barcodes may be scanned into a computer, a laptop, a wireless handheld device, and so forth, and subsequently communicated to the wire feeder 12, for example, via USB ports 44.

Still further, such identification codes corresponding to the one or more allowable devices may be manually input by an operator into a keypad of a suitable device and then transmitted to the controller 64 in the wire feeder 12. Such transmission may be via a wired or wireless connection to the USB ports 44 or directly to monitoring device 62. Still further, after input into a keypad or computer, the allowable parameter set may be transferred to the wire feeder 12 via USB device 46. Additionally, the allowable parameter set may be communicated to the wire feeder from a main job information system. Indeed, any of a variety of suitable ways of communicating an allowable set of parameters to the wire feeder 12 may be employed during learning mode. For further example, learned or preprogrammed job parameters and procedures may be stored in a memory of the wire feeder or other welding system component and subsequently retrieved for use in the current welding operation, as described in more detail below.

Figure 2:
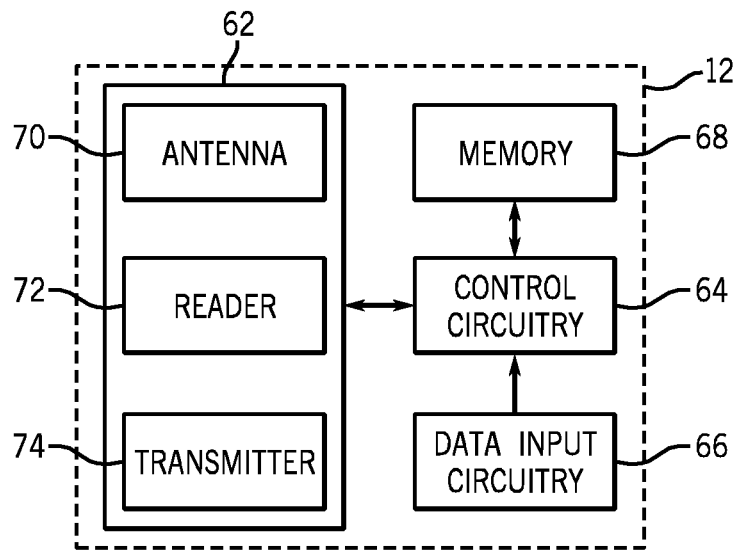
FIG. 2 is a block diagram illustrating exemplary internal components of an exemplary wire feeder enabled with a lockout mechanism in accordance with aspects of the present invention.

FIG. 2 is a block diagram illustrating exemplary components of the wire feeder 12 in more detail. However, in further embodiments, the wire feeder may include additional circuitry and mechanical components (e.g., wire spool mounting hub, wire drive assembly, etc.) not illustrated. As shown, the exemplary wire feeder 12 includes monitoring device 62, control circuitry 64, data input circuitry 66, and memory 68. The data input circuitry may be coupled to the USB ports 44 to receive incoming information and to route such information to the controller. The illustrated monitoring device 62 is a wireless monitoring device including an antenna 70, a reader 72, and a transmitter 74. The antenna 70 is adapted to receive signals, such as those transmitted by tags 16, 20, and 24, and communicate the data encoded in such signals to the reader 72. Likewise, the transmitter 74 is adapted to transmit information via the reader 72 and the antenna 70.

During learning mode operation, the control circuitry 64 interfaces with the monitoring device 62 and the data input circuitry 66 to receive and process an allowable parameter set, thus learning which devices, procedures, and/or operators are allowable for the given wire feeder 12. Once received, the control circuitry 64 is adapted to store the received allowable parameter set to memory 68 for future retrieval. Subsequently, during use mode operation, the control circuitry 64 is configured to receive a desired operational parameter set via at least one of the monitoring device 62 and the data input circuitry 66. The control circuitry 64 is further adapted to compare the desired parameter set to the stored allowable parameter set. Based on this comparison, the control circuitry 64 may log the desired parameter set to memory for use in the wire feeding operation or lock out the wire feeder and prevent wire from being fed. That is, if the desired parameter set is within the allowable parameter set, the control circuitry 64 may enable the wire feeder for operation. However, if the desired parameter set is not within the allowable parameter set, the control circuitry 64 locks out the wire feeder, thus preventing a wire feed from occurring. Such features of the wire feeder operation may be better understood by considering the methods described in detail below with respect to FIGS. 3 and 4.

Figure 3:
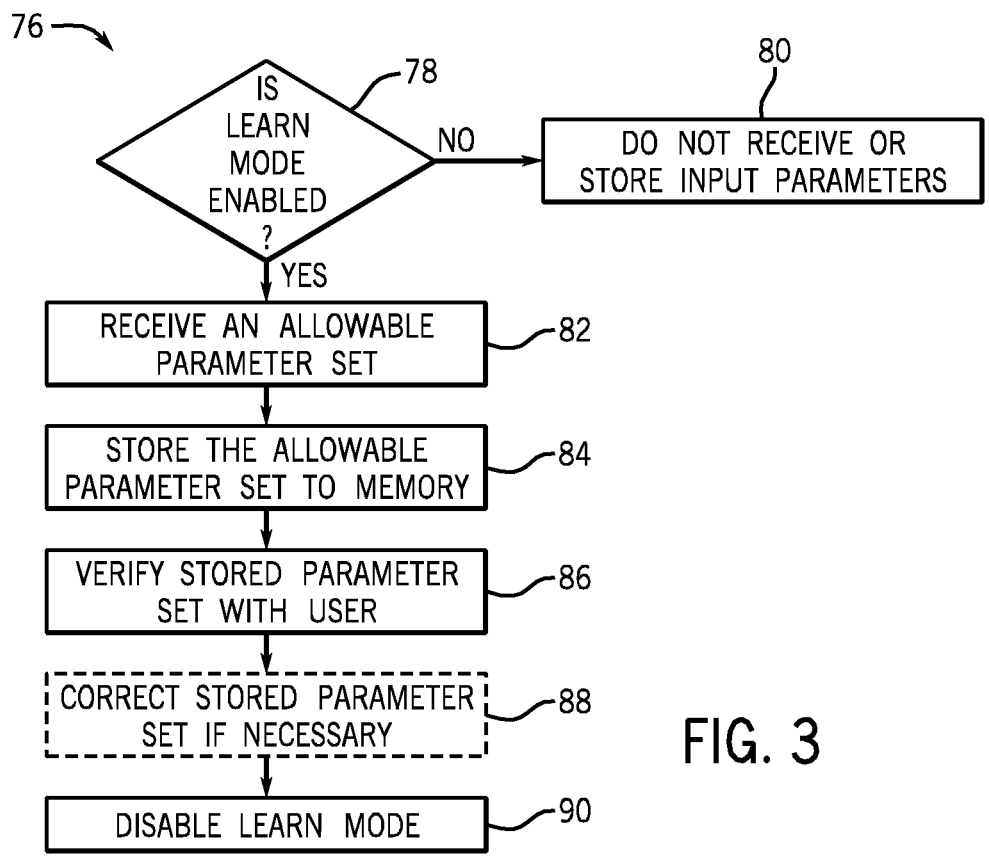
FIG. 3 is a method of controlling an exemplary wire feeder during a learning mode in accordance with aspects of the present invention.

Specifically, FIG. 3 illustrates a method 76 that may be employed by the control circuitry during a learning mode of operation. The method 76 begins by checking if learn mode is enabled (block 78). For example, the control panel of the wire feeder may include a switch, which, when placed in "learn mode" position, prompts the user for a code that allows the wire feeder to "learn" a set of parameters. If learn mode is not enabled, the controller prevents the wire feeder from receiving or storing input parameters (block 80). In some embodiments, such a feature may reduce or eliminate the possibility of an unauthorized user accidentally teaching the wire feeder a disallowable set of parameters.

The method 76 also includes the step of receiving an allowable parameter set (block 82) when learn mode is enabled, for example through any one of the methods described in detail above. Further, the method 76 includes storing the allowable parameter set to memory (block 84) and verifying the stored parameter set with the user (block 86) if desired in certain applications. If necessary, the stored parameter set may be modified and restored (block 88). Finally, learn mode may be disabled (block 90), and the wire feeder may enter use mode or may idle while waiting for further operator input.

Figure 4:
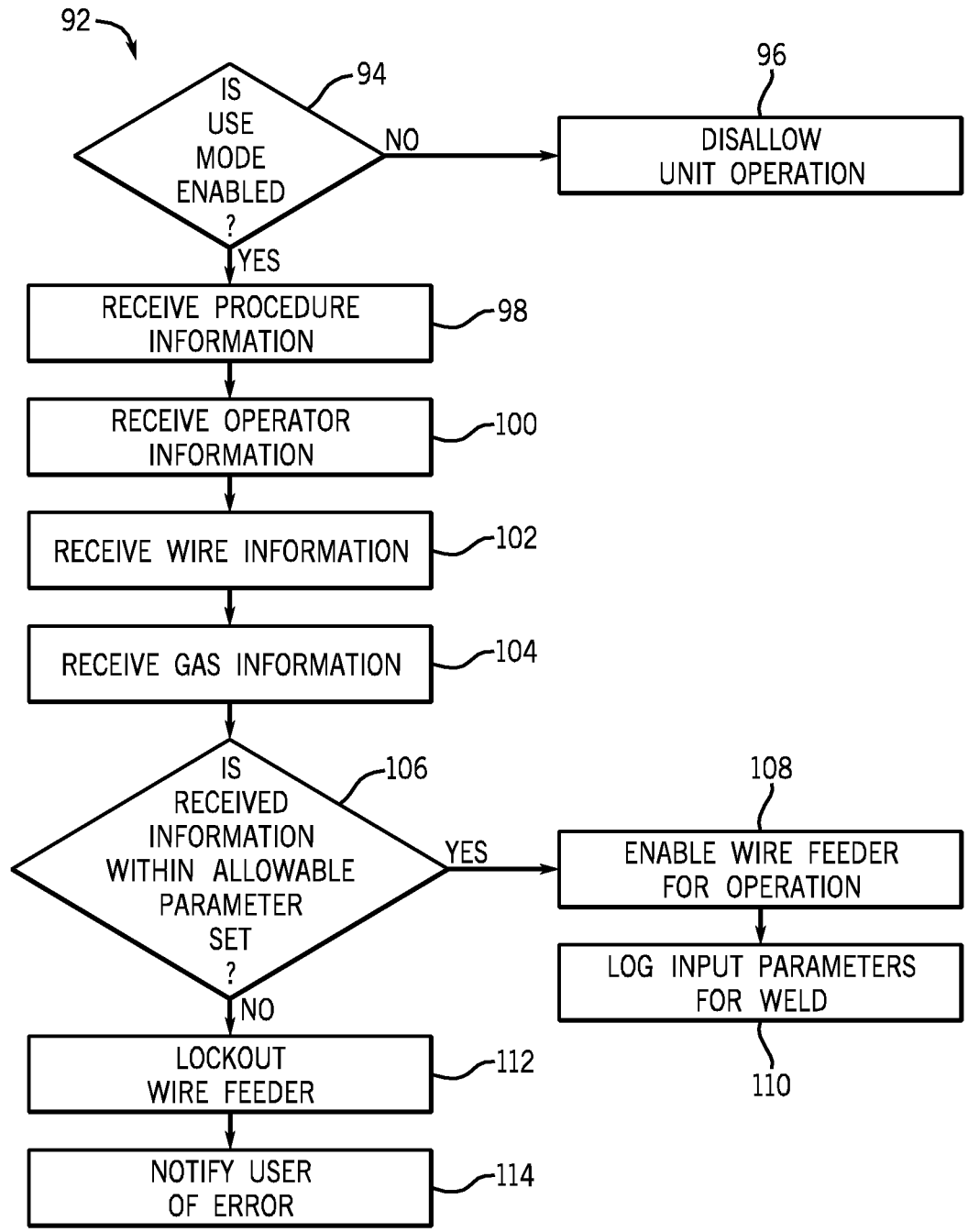
FIG. 4 is a method of controlling an exemplary wire feeder during a use mode in accordance with aspects of the present invention.

FIG. 4 is a method 92 that may be employed by the control circuitry during a use mode of operation. The method begins by checking if use mode is enabled (block 94). Again, in some embodiments, the control panel of the wire feeder may include a switch that a user may place in a "use mode" position to indicate initiation of a wire feeding operation. If use mode is not enabled, the controller disallows operation (block 96) and may display an error to the user. For example, the error may be communicated to the user via a handheld device, a personal computer, a cell phone, a systems message light, a display in welding system, a head-up display in a welding helmet, and so forth. If use mode is enabled, the method 92 includes checking for a desired operational parameter set. For example, in the illustrated embodiment, the method 92 includes the step of receiving procedure information (block 98), receiving operator information (block 100), receiving wire information (block 102), and receiving gas information (block 104). The controller is then adapted to check if the received information is within the allowable parameter set (block 106).

If the received parameter set is within the allowable parameter set, the method 92 includes the steps of enabling the wire feeder for a wire feeding operation (block 108) and logging the input parameter set for the operation (block 110). If the received parameter set is not within the allowable parameter set, the method 92 includes the step of locking out the wire feeder (block 112), thus preventing wire feed. The method 92 also includes notifying the user that an error has occurred (block 114). In such a way, the controller may substantially reduce or prevent the likelihood that an unauthorized user or an incompatible consumable is utilized with the wire feeder.

In the embodiments described herein, the exemplary wire feeders include a learn mode and a use mode. However, in further embodiments, the wire feeder may be configured for a use mode and not for a learn mode. That is, in such embodiments, the wire feeders may be internally preprogrammed prior to use (e.g., during manufacturing) such that the allowable set of parameters are already included in the memory of the wire feeder. As such, in some embodiments, the wire feeder need not be placed in use mode, but when the user utilizes the wire feeder, the use mode logic presented above may be applied by the controller. For example, the controller may receive the desired operational parameter set, compare the desired operational parameter set to the stored allowable parameter set, and lockout the wire feeder if the desired operational parameter set is not contained within the allowable parameter set.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
    a housing;
    a control panel disposed on the housing;
    a switch disposed on the control panel and comprising a learning mode position and a use mode position, wherein when the switch is positioned in the learning mode position, the welding system is placed in a learning mode during which the welding system is allowed to learn an allowable parameter set and disallowed to receive a desired parameter set, and when the switch is positioned in the use mode position, the welding system is placed in a use mode during which the welding system is allowed to receive the desired parameter set and disallowed to learn the allowable parameter set; and
    control circuitry disposed in the housing and configured to selectively enable the learning mode when the switch is positioned in the learning mode position and the use mode when the switch is positioned in the use mode position.

2. The welding system of claim 1, wherein the welding system comprises a wire feeder, and the control circuitry enables the wire feeder to feed wire from a wire spool when the desired parameter set is contained within the allowable parameter set and locks the wire feeder to prevent wire feed from the wire spool when the desired parameter set is not contained within the allowable parameter set.

3. The welding system of claim 1, further comprising a monitoring device disposed in or on the housing and configured to receive data encoding the allowable parameter set.

4. The welding system of claim 3, wherein the monitoring device comprises a reader configured to receive and store a signal from a wireless tag disposed on an allowable device during the enabled learning mode.

5. The welding system of claim 1, comprising a universal serial bus (USB) port disposed in a surface of the housing.

6. The welding system of claim 5, wherein the USB port is coupled to data input circuitry configured to receive and store a signal encoding one or more allowable parameters during the enabled learning mode.

7. The welding system of claim 1, wherein the allowable parameter set comprises at least one of a certified operator, a compatible wire spool, a weld procedure and a compatible gas.

8. The welding system of claim 1, wherein the control circuitry is further configured to notify an operator of an error via at least one of a handheld device, a personal computer, a systems message light, a display in the welding system, and a heads-up display located in a welding helmet when the desired parameter set is outside the allowable parameter set.

9. The welding system of claim 1, wherein the allowable parameter set is received by the control circuitry from a main job information system.

10. A method of controlling a welding device, comprising:
selectively enabling a learning mode, during which the welding device is allowed to learn an allowable parameter set and disallowed to receive a desired parameter set, and a use mode, during which the welding system is allowed to receive the desired parameter set and disallowed to receive the allowable parameter set;
receiving, when the learning mode is enabled, the allowable set of parameters;
receiving, when the use mode is enabled, the desired set of parameters;
comparing the desired set of parameters to the allowable set of parameters;
locking out the welding device to prevent operation when the desired set of parameters is not within the allowable set of parameters; and
allowing operation of the welding device when the desired set of parameters is within the allowable set of parameters.

11. The method of claim 10, wherein receiving the allowable set of parameters comprises receiving a wireless signal from a wireless tag disposed on an allowable device.

12. The method of claim 11, wherein the allowable set of parameters comprises at least one of a wire spool, an operator, and a gas cylinder.

13. The method of claim 10, wherein receiving the allowable set of parameters comprises receiving a signal from a device coupled to a universal serial bus (USB) port of the wire feeder.

14. The method of claim 10, wherein the welding device comprises a wire feeder and the operation of the welding device comprises feeding wire from a wire feeder.

15. The method of claim 10, wherein the learning mode is selectively enabled when a user indicates that the learning mode is desired and the user enters a code that unlocks the learning mode.

16. A method of control for a wire feeder comprising:
selectively activating a learning mode, during which the wire feeder is allowed to learn an allowable data set and disallowed to receive an operational data set, when a user indicates that the learning mode is desired and the user enters a code that unlocks the learning mode;
disallowing learning when the learning mode is not selectively enabled;
selectively activating a use mode, during which the wire feeder is allowed to receive the operational data set and disallowed to receive the allowable data set, of the wire feeder when the user indicates that the use mode is desired;
receiving the allowable data set and storing the allowable data set to memory when the learning mode is activated; and
receiving the operational data set when the use mode is activated, referencing the allowable data set to check if the operational data set is allowable, logging the operational data set and enabling the wire feeder to operate when the operational data set is allowable, and disabling the wire feeder when the operational data set is not allowable.

17. The method of control of claim 16, comprising notifying a user of an error state via at least one of a handheld device, a personal computer, a systems message light, a display in the welding system, and a heads-up display located in a welding helmet when the operational data set is not allowable in use mode.

18. The method of control of claim 16, comprising receiving the allowable data set via a wireless connection between the wire feeder and an information source.

19. The method of control of claim 16, comprising receiving the allowable data set from one or more wireless identification tags positioned on one or more allowable devices and/or operators.

20. The method of control of claim 17, comprising receiving the allowable data set from a main job information system.

21. The method of control of claim 16, comprising receiving the allowable data set from a keypad of a computer or wireless device via a universal serial bus (USB) port disposed on the wire feeder.

* * * * *